(12) United States Patent
Pirbhai et al.

(10) Patent No.: US 7,751,408 B2
(45) Date of Patent: Jul. 6, 2010

(54) CIRCUIT EMULATION OVER AN IP INTERWORKING VLL

(75) Inventors: Shafiq Pirbhai, Ottawa (CA); Neil Hart, Chelsea (CA)

(73) Assignee: Alcatel Lucent, Paris (FR)

( * ) Notice: Subject to any disclaimer, the term of this patent is extended or adjusted under 35 U.S.C. 154(b) by 196 days.

(21) Appl. No.: 12/010,489

(22) Filed: Jan. 25, 2008

(65) Prior Publication Data

US 2009/0190610 A1 Jul. 30, 2009

(51) Int. Cl.
H04L 12/28 (2006.01)

(52) U.S. Cl. ............... 370/395.5; 370/395.52; 370/395.53; 370/466

(58) Field of Classification Search ........... 370/352, 370/354, 395.1, 395.5, 395.52, 395.53, 466
See application file for complete search history.

(56) References Cited

U.S. PATENT DOCUMENTS

| | | | |
|---|---|---|---|
| 6,115,385 A * | 9/2000 | Vig | 370/401 |
| 6,731,638 B1 * | 5/2004 | Ofek | 370/395.4 |
| 6,731,649 B1 * | 5/2004 | Silverman | 370/466 |
| 6,963,561 B1 * | 11/2005 | Lahat | 370/356 |
| 7,327,739 B1 * | 2/2008 | Holmgren et al. | 370/395.54 |
| 2003/0133461 A1 * | 7/2003 | Ho et al. | 370/395.52 |
| 2004/0030804 A1 * | 2/2004 | Wiget et al. | 709/245 |
| 2004/0190548 A1 * | 9/2004 | Harel et al. | 370/466 |
| 2005/0147104 A1 * | 7/2005 | Ould-Brahim | 370/395.5 |
| 2005/0190757 A1 * | 9/2005 | Sajassi | 370/389 |
| 2005/0238049 A1 * | 10/2005 | Delregno | 370/466 |
| 2006/0182120 A1 * | 8/2006 | Lee | 370/395.53 |
| 2006/0209886 A1 * | 9/2006 | Silberman et al. | 370/466 |
| 2007/0071029 A1 * | 3/2007 | White et al. | 370/466 |
| 2008/0144632 A1 * | 6/2008 | Rabie et al. | 370/395.5 |

(Continued)

FOREIGN PATENT DOCUMENTS

EP 1176774 A2 1/2002

(Continued)

OTHER PUBLICATIONS

A. Vainshtein, Ed., et al.),Vainshtein & Stein, "Structure-Agnostic Time Division Multiplexing (TDM) over Packet (SAToP)", The Internet Society (2006), pp. 1-27.

(Continued)

Primary Examiner—Steven H Nguyen
Assistant Examiner—Benjamin Elliott
(74) Attorney, Agent, or Firm—Kramer & Amado P.C.

(57) ABSTRACT

A method of circuit emulation over an IP interworking VLL, and related system, the method including one or more of the following: configuring a circuit emulation port with one or more logical interfaces; configuring one or more channels on each of the one or more logical interfaces; configuring the one or more channels with a destination IP address; configuring the one or more channels with a destination UDP port number; specifying an Ipipe VLL for each of the one or more channels; determining TDM traffic to go onto the specified Ipipe; packetizing TDM traffic; encapsulating the TDM traffic with encapsulation; inserting one or more packets of the TDM traffic into an IP interworking VLL; sending the one or more packets through the Ipipe; stripping the encapsulation from the one or more packets of the TDM traffic; and forwarding the one or more packets to a destination.

10 Claims, 3 Drawing Sheets

U.S. PATENT DOCUMENTS

2009/0059811 A1 * 3/2009 Wisely et al. .............. 370/252
2009/0190610 A1 * 7/2009 Pirbhai et al. .............. 370/466

FOREIGN PATENT DOCUMENTS

| EP | 1768321 | A1 | 3/2007 |
| WO | 0115396 | A1 | 3/2001 |

OTHER PUBLICATIONS (A. Vainshtein, Ed., et al.), "Structure-aware TDM Circuit Emulation Service over Packet Switched Network (CESoPSN)", May 2006, pp. 1-32.

(H. Shah, et al.), "ARP Meditation for IP Interworking of Layer 2 VPN", Jul. 2007, pp. 1-22.

Malis, A., Synchronous Optical Network/Synchronous Digital Hierarchy (SONET/SDH) Circuit Emulation over Packet (CEP), Network Working Group RFC 4842, The IETF Trust, Apr. 1007.

* cited by examiner

CIRCUIT EMULATION OVER AN IP INTERWORKING VLL

BACKGROUND OF THE INVENTION

1. Field of the Invention

This invention relates generally to circuit emulation in a network.

2. Description of Related Art

Virtual Leased Line (VLL) is a way to provide Ethernet based point to point communication over Internet protocol (IP) and Multi Protocol Label Switching (MPLS) networks (IP/MPLS). This technology is also sometimes referred to as Virtual Private Wire Service (VPWS) or Ethernet over MPLS (EoMPLS). VLL typically uses the pseudo-wire encapsulation for transporting Ethernet traffic over an MPLS tunnel across an IP/MPLS backbone In computer networking and telecommunications, MPLS is a data-carrying mechanism that belongs to the family of packet-switched networks. MPLS operates at an OSI Model layer that is generally considered to lie between traditional definitions of Layer 2 or data link layer and Layer 3 or network layer. Thus, MPLS is alternatively referred to as a "Layer 2.5" protocol.

MPLS was designed to provide a unified data-carrying service for both circuit-based clients and packet-switching clients which provide a datagram service model. MPLS can be used to carry many different kinds of traffic, including IP packets, as well as native ATM, SONET, and Ethernet frames.

Circuit Emulation over IP (CEoIP) provides a protocol-independent transport over IP networks. CEoIP enables proprietary or legacy applications to be carried transparently to the destination, similar to a leased line.

Typical implementations of the foregoing technology are not able to provide circuit emulation (CEM) over an IP/UDP over an MPLS network when one endpoint is Ethernet and the other endpoint is a non-Ethernet technology. Thus, there is a need for CEM over IP/UDP over an MPLS network when one endpoint is Ethernet and the other endpoint is a non-Ethernet technology.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for circuit emulation over an IP interworking VLL, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

Circuit emulation service (CES) enables carriers to realize cost savings by moving time division multiplexing (TDM) circuits, such as voice circuits, onto CES over a packet switched network. Consequently, CES is a fast growing area in the telecommunications market.

Various exemplary embodiments employ one of three different standards for addressing the issues described above and below. One approach is used to enable an application on an IP/UDP encapsulation of traffic that goes on a TDM circuit. This approach is typically used for a wireless application or another application that requires some sort of interworking between the TDM format and an IP format.

The three different standards for encapsulations described herein include one over MPLS, another over Ethernet, and a third using IP/UDP. The third option is believed to be preferable for applications where MPLS cannot be used.

A typical deployment of this third approach includes CES over IP, layer 3 routed networks. However, such embodiments do not have the reliability or quality of service (QoS) that can be obtained by other approaches such as MPLS.

Reliability and QoS capabilities are important in some applications, for example, to ensure that requirements of the traffic can be met. Examples of such applications include voice traffic that is sensitive to delays in transmission. This concern becomes particularly important when a communication carrier desires to maximize the utilization of a capacity of its communications network.

By employing an IP networking VLL, part of a network that has MPLS is able to take advantage of QoS requirements. Accordingly, the subject matter described herein enables an application to take advantage of QoS by using IP/MPLS in the parts of a network capable of supporting IP/MPLS. Accordingly, various exemplary embodiments encapsulate IP/UDP into an IP interworking VLL and send it over a network with guaranteed QoS to an opposing end of the network.

Various exemplary embodiments are implemented for frame relay, ATM and PPP. Such embodiments route IP from one side capable of responding to Ethernet ARP requests to another side which is not capable of responding to the Ethernet ARP requests. Various exemplary embodiments add circuit emulation to the foregoing.

Where implemented, no IP addresses are included on the circuit emulation side of a system. This is true because circuit emulation converts the IP stream into a pure TDM stream such that no IP address is necessary for the stream.

Various exemplary embodiments include E1/T1 terminated on channel such as a CEM channel. However, such embodiments will not typically respond to ARP request. Accordingly, various exemplary embodiments overcome one or more of the problems described above.

For example, various exemplary embodiments encapsulate CEM traffic with IP/UDP headers in an IP interworking VLL (Ipipe). An Ipipe enables a non-Ethernet technology such as ATM or frame relay to connect to Ethernet at a far end when using layer 3 routed PDUs and when there is no way for a non-Ethernet technology to send an ARP response. Accordingly, in various exemplary embodiments, one end of the pipe is a CEM channel service access point (SAP) and another end of the pipe is an Ethernet SAP.

Based on the foregoing, various exemplary embodiments enable advantages of MPLS to be realized for CEM services.

Likewise, various exemplary embodiments enable QoS to be realized for CEM services. Such advantages are not available in pure IP/UDP systems.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
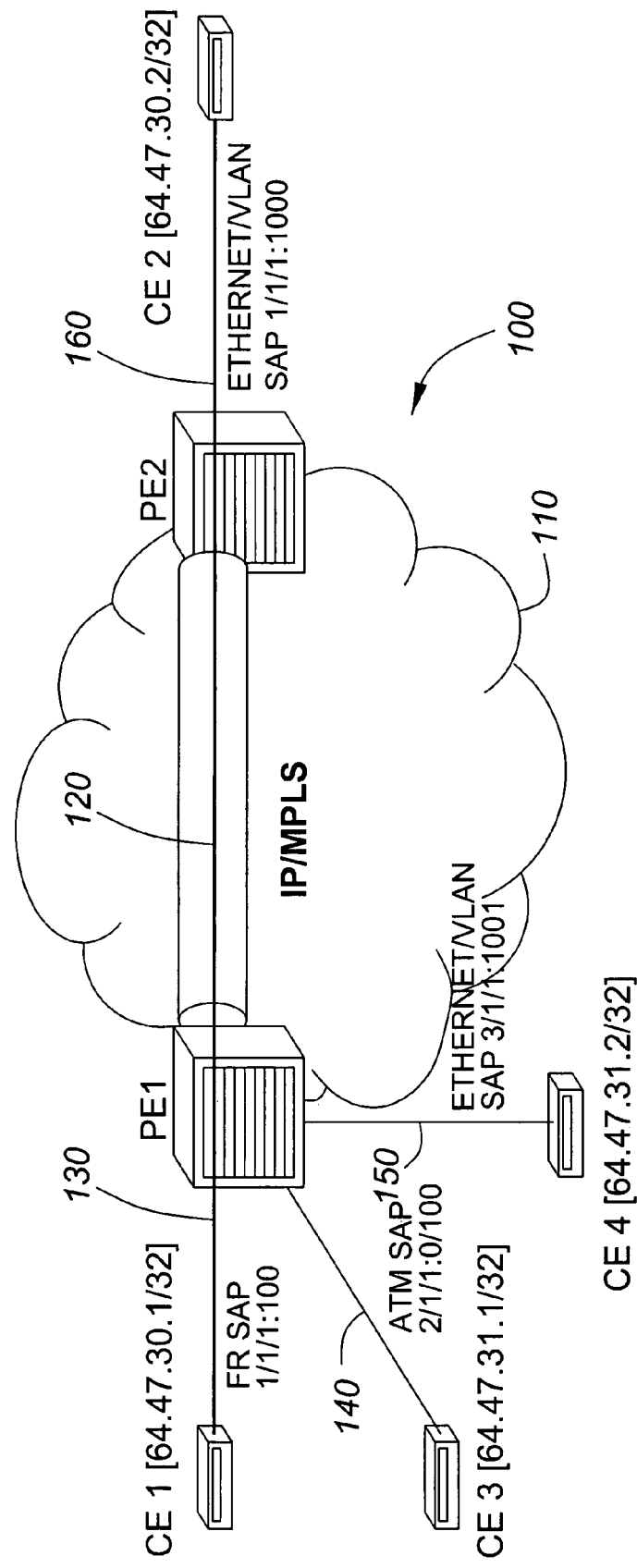
FIG. 1 is a schematic diagram of an embodiment of an exemplary system of an IP interworking VLL.

Referring now to the drawings, in which like numerals refer to like components or steps, there are disclosed broad aspects of various exemplary embodiments.

FIG. 1 is a schematic diagram of an embodiment of an exemplary system 100 of an IP interworking VLL. System 100 includes an IP/MPLS network cloud 110, CE 1, CE 2, CE 3, CE 4, PE 1 and PE 2. CE 1 is indicated with an IP address of 64.47.30.1/32. CE 2 is depicted with an IP address of 64.47.30.2/32. CE 3 is depicted with IP address 64.47.31.1/32. CE 4 is depicted with IP address 64.47.31.2/32.

CE 1 is connected to PE 1 through communications line 130. In the depicted system 100, communication line 130 is indicated as an FR SAP 1/1/1:100. CE 2 is connected to PE 2 through communication line 160. In system 100 communication line 160 is depicted as an Ethernet/VLAN SAP 1/1/1:1000. CE 3 is connected to PE 1 through communication line 140 depicted as ATM SAP 2/1/1:0/100. CE 4 is connected to PE 1 through communication line 150 depicted as Ethernet/VLAN SAP 3/1/1:1001. PE 1 is connected to PE 2 through IP/MLS cloud 110 by way of communication line 120. In various exemplary embodiments, communication line 120 is an IP pseudo-wire (PW). This is also referred to herein as an Ipipe.

The Ipipe of exemplary system 100 provides IP connectivity between a host attached to a point-to-point access circuit. Examples of such point-to-point access circuits include frame relay (FR), ATM and PPP with routed PDU IPv4 encapsulation and a host attached to an Ethernet interface. In various exemplary embodiments, both hosts appear to be on the same IP interface. In various exemplary embodiments, this feature enables the interworking of services between different link layer technologies. Accordingly, a portion of system 100 uses IP/MPLS and another portion of system 100 is purely IP and does not have any QoS guarantees.

In order to be able to forward IP packets between CE 1 and CE 2 in FIG. 1, PE 2 is manually configured in various exemplary embodiments with both CE 1 and CE 2 IP addresses. In various exemplary embodiments, PE 2 maintains an ARP cache context for each IP interworking VLL. Likewise, in various exemplary embodiments, PE 2 keeps track of the association of IP to MAC addresses for ARP requests received by PE 2 over the Ethernet SAP.

In various exemplary embodiments, to forward unicast frames destined to CE 2, PE 2 knows the CE 2 MAC address. In various exemplary embodiments where there is no entry in the ARP cache of PE 2, then PE 2 send an ARP request message for the CE 2 MAC address over the Ethernet SAP 160. Accordingly, unicast frames destined for CE 1 are forwarded from CE 2 to PE 2 over Ethernet SAP 160.

In various exemplary embodiments, PE 2 validates the MAC destination address of the received Ethernet frame before accepting unicast frames forwarded from CE 2 to PE 2 destined for CE 1. If the MAC destination address of the received Ethernet frame is validated, it matches the MAC destination address of the Ethernet SAP. In various exemplary embodiments, PE 2 then removes the Ethernet header and encapsulates the IP packet directly into a PW without a control word. After the PW without a control word is sent from PE 2 to PE 1 through IP/MPLS cloud 110 by way of IP pseudo-wire 120, PE 1 removes the PW encapsulation and forwards the IP packet over the FR SAP 130 using an applicable standard for routed PDU encapsulation.

Figure 2:
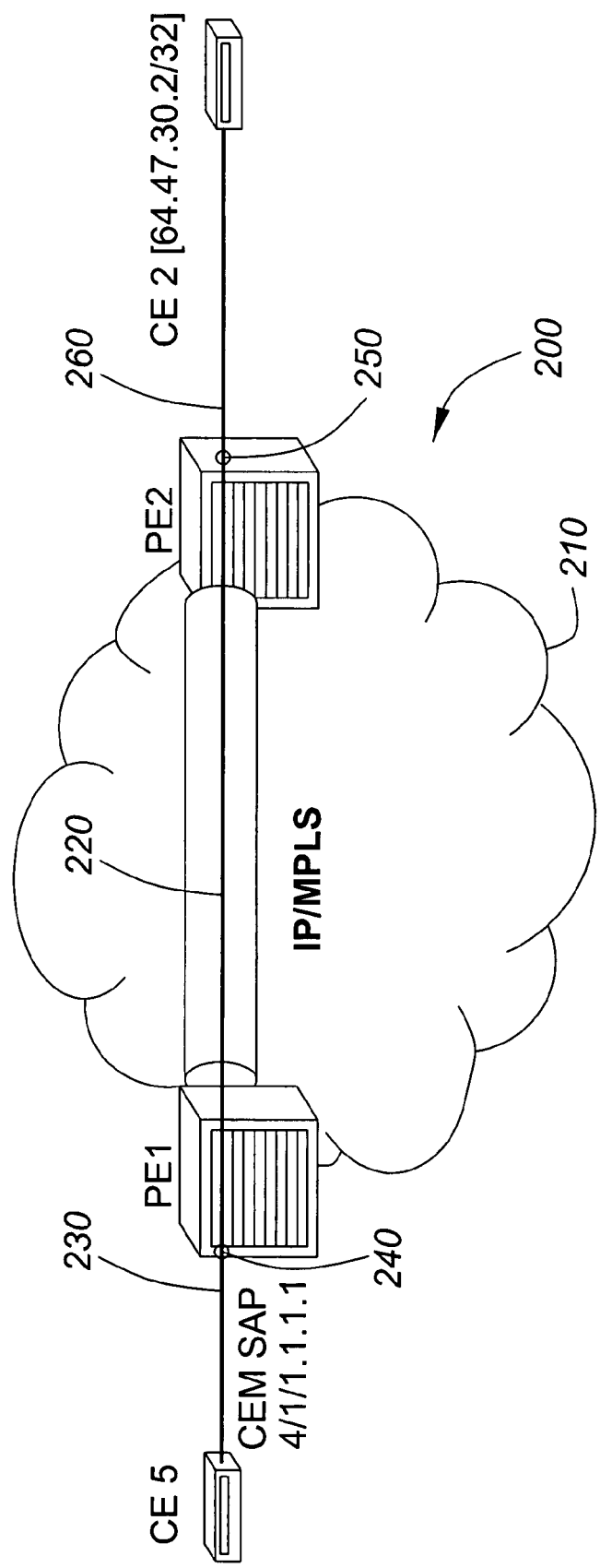
FIG. 2 is a schematic diagram of an embodiment of an exemplary system for circuit emulation over an IP interworking VLL.

FIG. 2 is a schematic diagram of an embodiment of an exemplary system 200 for circuit emulation over an IP interworking VLL. Describing aspects of this process beginning at CE 2, a TDM stream of data is taken in and converted into an IP packet with a UDP header. The converted IP packet with a UDP header is then sent over communications link 260 to PE 2. Then, typically, PE 2 performs the interworking to actually send the converted IP packet with a UDP header over the Ipipe 220. This transmission in turn sends the IP packet over an MPLS backbone. Subsequently, at PE 1, the IP packet with the UDP header is translated back into a TDM stream from the IP/MPLS packet. Accordingly, transmission of the information contained in the packet continues outside of IP/MPLS 210.

Exemplary system 200 corresponds to exemplary system 100 in many respects. A significant difference between exemplary system 200 and exemplary system 100 is that exemplary system 200 adds circuit emulation.

IP PW 220 and IP/MPLS cloud 210 correspond to IP PW 120 and IP/MPLS cloud 110, respectively. Likewise, CE 2 is repeated between exemplary system 100 and exemplary system 200. IP PW Ipipe 220 terminates at PE 1 on a CEM port 240. CEM port 240 has, for example, CEM SAP 4/1/1.1.1.1.

At an opposing end, Ipipe 220 terminates at PE 2 on Ethernet port 250. In various exemplary embodiments, Ethernet port 250 is a POS port. Ethernet port 250 has, for example, Ethernet/VLAN SAP 1/1/1:1000.

Communication path 230 connects CE 5 and PE 1. In various exemplary embodiments communications path 230 carries TDM traffic in both directions. Thus, in various exemplary embodiments, communications path 230 carries no IP traffic. As depicted in exemplary system 200, communication path 230 is labeled CEM SAP 4/1/1.1.1.1.

In various exemplary embodiments, CEM port 240 is configured with one or more logical interfaces. In various exemplary embodiments, each of a plurality of logical interfaces with which CEM port 240 is configured has a unique IP address (A.B.C.D). In various exemplary embodiments, one or more channels are configured on each interface with a unique UDP port number for each channel. In various exemplary embodiments, the one or more channels are also configured with the far end CE 2 destination IP address and destination UDP port number. Similarly, for each channel, an Ipipe VLL is specified in various exemplary embodiments. For the exemplary channel depicted in system 200, the VLL terminates on PE 2.

In various exemplary embodiments, PE 2 is connected through a statically routed IP network to CE 2 by way of communication channel path 260. In various exemplary embodiments, CE 2 is a simple circuit emulation device capable of handling the routed IP encapsulation of circuit emulation traffic. In various exemplary embodiments, port 250 faces CE 2 and is configured in a special mode that allows it to determine traffic that should go onto the IP PW 220 based on the UDP port number of the received packets.

In various exemplary embodiments, as TDM traffic that is encapsulated in IP interworking VLL 220 arrives at PE 1 from PE 2, that traffic is packetized and encapsulated with the IP header specified by the configuration and converted into a TDM stream. For example, in various exemplary embodiments, as TDM traffic arrives, it is encapsulated with a CE 2 destination IP address, destination UDP port number, PE 1 source IP address and UDP port corresponding to the channel.

In various exemplary embodiments, the packet is then inserted into the IP interworking VLL and sent through the MPLS network cloud 210 by way of IP PW 220. When the packet arrives at PE 2, the MPLS encapsulation is stripped and the packet is forwarded out of port 250 towards CE 2 by way of communications path 260. In embodiments where port 250 is an Ethernet port, an ARP request is generated, specifying CE 2 as the destination and specifying the IP address of CEM port 240 as the source.

In various exemplary embodiments, as TDM traffic arrives at CE 2, that traffic is similarly packetized and encapsulated with an IP header in which the destination IP address and UDP port correspond to CEM port 240. Again, in embodiments where port 250 is Ethernet, an ARP request will have been received, either from PE 2 if they are directly connected or from an intervening router along communication path 260.

In various exemplary embodiments, PE 2 responds to ARP requests from CE 2 for an IP address associated with PE 1. In various exemplary embodiments when the packet arrives on PE 2, a special lookup is performed and the combination of IP address and UDP port number tells PE 2 which IP interworking VLL to put the packet onto. In various exemplary embodiments, PE 2 then adds MPLS encapsulation and forwards the packets towards PE 1 through IP/MPLS cloud 210 by way of IP PW 220.

Accordingly, PE 2 is a location where IP/UDP gets converted or translated to the IP/MPLS interworking into IP PW 220. According to the description above, in various exemplary embodiments, all of port 250 is used for the application described herein.

According to the foregoing, FR SAP communications path 130 is replaced by CEM SAP 240. Additionally, in various exemplary embodiments, each CEM circuit is associated with a respective UDP port on the IP address 240. This includes, for example, the IP address of CE 5.

In general, as described herein, an Ipipe carries CEM traffic for only one IP address and UDP port per CEM circuit. Accordingly, PE 2 must be configured with an IP address and UDP port for each Ipipe carrying CEM traffic.

Figure 3:
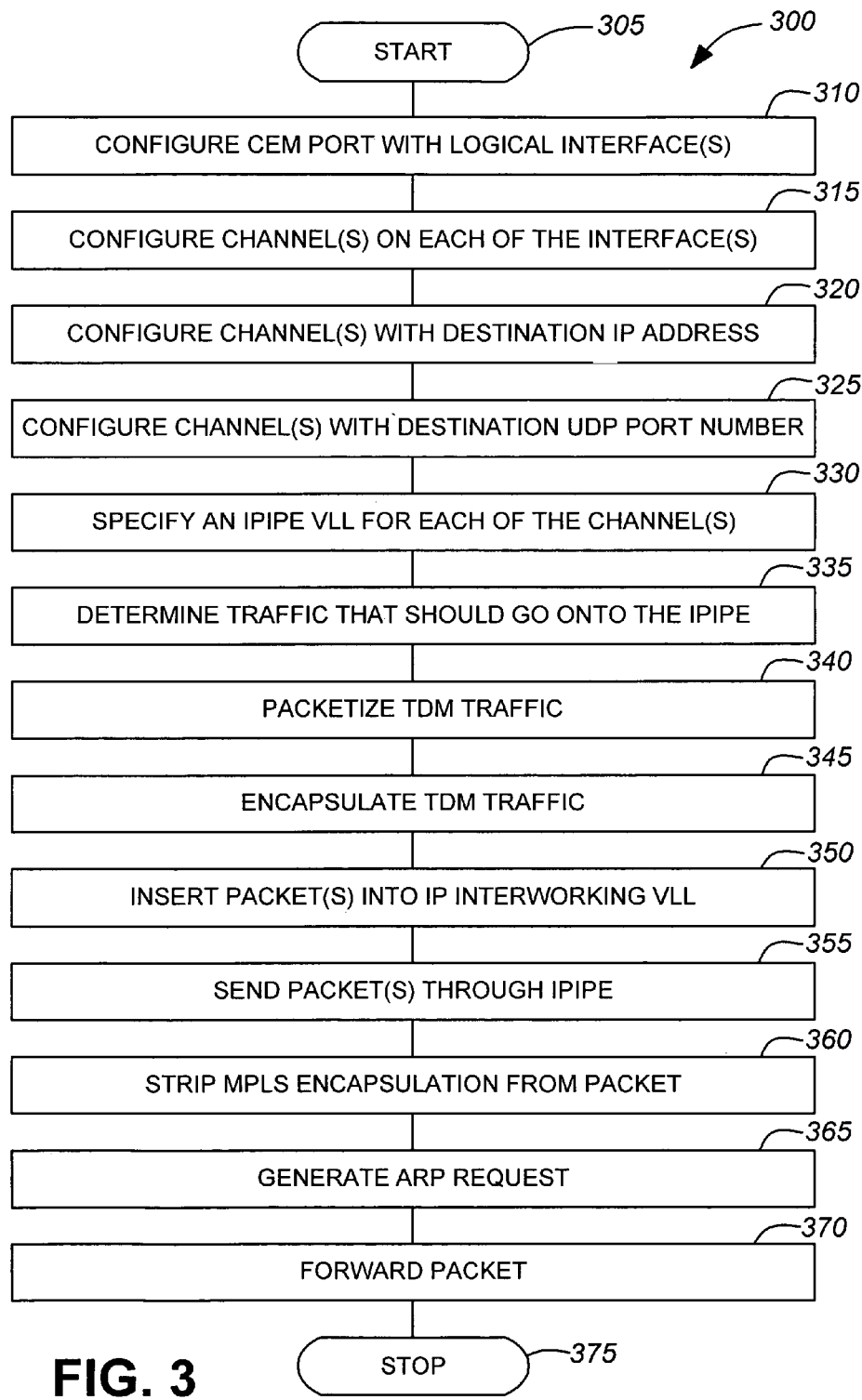
FIG. 3 is a flow chart of an exemplary method of circuit emulation over an IP interworking VLL.

FIG. 3 is a flow chart of an exemplary method 300 of circuit emulation over an IP interworking VLL. The method 300 starts in step 305 and continues to step 310.

In step 310, CEM port 240 is configured with one or more logical interfaces. As discussed above, in various exemplary embodiments, each of the logical interfaces has a unique IP address.

Following step 310, the method 300 proceeds to step 315. In step 315, one or more channels are configured on each interface. In various exemplary embodiments, this includes configuring each channel with a unique UDP port number for the specific interface.

Following step 315, the method 300 proceeds to step 320. In step 320, one or more channels are also configured with the far end destination IP address. Following step 320, the method 300 proceeds to step 325. In step 325, the one or more channels are further configured with a destination UDP port number.

Following step 325, the method 300 proceeds to step 330. In step 330, an Ipipe VLL is specified for each of the one or more channels.

Following step 330, the method 300 proceeds to step 335. In step 335, a determination is made of traffic that should go onto the Ipipe. In various exemplary embodiments, this determination is made based on the IP address and UDP port number of the received packets.

Following step 335, the method 300 proceeds to step 340. In step 340, the TDM traffic is packetized. In various exemplary embodiments, the TDM traffic is packetized as it arrives on the example channel such as PE 1 as discussed above.

Following step 340, the method 300 proceeds to step 345. In step 345, the TDM traffic is encapsulated. In various exemplary embodiments, step 345 is also performed as the TDM traffic arrives on example channel such as PE 1.

In various exemplary embodiments, the TDM traffic is packetized and encapsulated in steps 340 and 345 with an IP header and UDP header specified by the configuration. This is discussed in greater detail above.

Following step 345, the method 300 proceeds to step 350. In step 350, each packet is inserted into the IP interworking VLL.

Following step 350, the method 300 proceeds to step 355. In step 355, each packet is sent through the MPLS network cloud 210 by way of the Ipipe 220.

Following step 355, the method 300 proceeds to step 360. In step 360, the MPLS encapsulation is stripped from the packet. As described above, in various exemplary embodiments, step 360 occurs when the packet arrives at PE 2.

As also described above, in step 365, an ARP request is generated in embodiments where port 250 is an Ethernet port. Accordingly, it should be apparent that step 365 is omitted from some embodiments.

In step 370, the packet is forwarded, for example, out of port 250 towards CE 2 by way of communications path 260 as described above. Following step 370, the method 300 proceeds to step 375 where the method 300 stops.

Based on the foregoing, various exemplary embodiments achieve costs savings an improved QoS over previously known solutions. In various exemplary embodiments, costs savings are achieved from the capability of interworking Ethernet and non-Ethernet CE without requiring additional equipment or upgrades. Likewise, in various exemplary embodiments, QoS benefits arise from TE capabilities and from using the IP/MPLS pseudo-wires to carry the CEM traffic over a carriers core network.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A method of circuit emulation over an Internet Protocol (IP) interworking Virtual Leased Line (VLL) to enable a circuit emulation port having non-Ethernet technology to connect to an Ethernet port, the method comprising:

configuring the circuit emulation port with one or more logical interfaces;

configuring one or more channels on each of the one or more logical interfaces;

configuring the one or more channels with a destination IP address;

configuring the one or more channels with a destination User Datagram Protocol (UDP) port number;

specifying an Ipipe VLL for each of the one or more channels;

determining Time Division Multiplexed (TDM) traffic to go onto the specified Ipipe;

packetizing TDM traffic;

encapsulating the TDM traffic with encapsulation;

inserting one or more packets of the TDM traffic into the IP interworking VLL;

sending the one or more packets through the Ipipe;

stripping the encapsulation from the one or more packets of the TDM traffic;

generating an Address Resolution Protocol (ARP) request, wherein the ARP request specifies a circuit emulation device as a destination and an IP address of the circuit emulation port as a source; and forwarding the one or more packets from the Ethernet port to an IP destination.

2. The method of circuit emulation over the IP interworking VLL, according to claim 1, wherein each of the one or more logical interfaces has a unique IP address.

3. The method of circuit emulation over the IP interworking VLL, according to claim 1, wherein encapsulating the TDM traffic includes encapsulating the TDM traffic with an IP header.

4. The method of circuit emulation over the IP interworking VLL, according to claim 3, wherein encapsulating the TDM traffic includes encapsulating the TDM traffic with the destination IP address, the destination UDP port number, the source IP address, and a UDP port number corresponding to the one or more channels.

5. The method of circuit emulation over the IP interworking VLL, according to claim 1, further comprising:

performing a special lookup wherein a combination of the destination IP address and the UDP port number results in a determination of the IP interworking VLL in which to insert the one or more packets.

6. The method of circuit emulation over the IP interworking VLL, according to claim 1, wherein the TDM traffic is encapsulated with MPLS encapsulation.

7. The method of circuit emulation over the IP interworking VLL, according to claim 1, wherein the Ipipe carries circuit emulation traffic for only one destination IP address and only one destination UDP port, further comprising:

tracking the destination UDP port associated with each Ipipe for a given destination IP address.

8. The method of circuit emulation over the IP interworking VLL, according to claim 7, further comprising:

performing the tracking with an ARP cache.

9. A system for circuit emulation (CEM) over an IP interworking VLL to enable CEM ports having non-Ethernet technology to connect to Ethernet ports, the system comprising:

a source that generates one or more packets for transmission;

a first communication path that transmits the one or more packets from the source;

a first CEM port having one or more logical interfaces that receives the one or more packets from the source, each of the one or more logical interfaces having one or more channels, and each of the one or more channels configured with a destination IP address and UDP port number;

an IP/MPLS network cloud having an IP pseudo-wire Ipipe that receives packetized and encapsulated traffic, including the one or more packets, from the source and transmits forward the packetized and encapsulated traffic; and a second CEM port that receives the packetized and encapsulated traffic, strips the encapsulation from the one or more packets, and forwards the one or more packets from an Ethernet port to a destination, wherein an ARP request specifies a circuit emulation device as a destination and an IP address of the second CEM port as a source.

10. The system for circuit emulation over the IP interworking VLL, according to claim 9, further comprising:

a second communications path that forwards the one or more packets to the destination: and a destination that receives the one or more packets.

* * * * *